United States Patent [19]
Houde et al.

[11] Patent Number: 5,797,094
[45] Date of Patent: Aug. 18, 1998

[54] METHOD AND APPARATUS FOR SUPPORTING THE DELIVERY OF SHORT MESSAGE SERVICE MESSAGES TO SLEEPING MOBILE STATIONS IN A CELLULAR COMMUNICATIONS SYSTEM

[75] Inventors: Michel Houde, St. Laurent; Eric Turcotte, Verdun; Wayne Tom, St. Laurent; Alain Boudreau, Le Gardeur, all of Canada

[73] Assignee: Telefonaktiebolaget L M Ericsson (publ), Stockholm, Sweden

[21] Appl. No.: 883,175

[22] Filed: Jun. 26, 1997

Related U.S. Application Data

[63] Continuation of Ser. No. 447,401, May 23, 1995, abandoned.

[51] Int. Cl.⁶ .................................................. H04M 11/10
[52] U.S. Cl. ..................... 455/412; 455/38.3; 455/413; 455/433
[58] Field of Search ..................... 455/38.3, 412, 455/413, 433, 435, 437, 440, 127, 18; 379/331

[56] References Cited

U.S. PATENT DOCUMENTS

| | | | |
|---|---|---|---|
| H610 | 8/1989 | Focarile et al. | 379/60 |
| 4,353,065 | 10/1982 | Mori | 340/825.44 |
| 4,449,248 | 5/1984 | Leslie et al. | 455/38 |
| 4,506,386 | 3/1985 | Ichikawa et al. | 455/343 |
| 4,577,315 | 3/1986 | Otsuka | 370/95 |
| 4,736,461 | 4/1988 | Kawasaki et al. | 455/343 |
| 5,031,231 | 7/1991 | Miyazaki | 455/54 |
| 5,058,203 | 10/1991 | Inagami | 455/89 |
| 5,109,530 | 4/1992 | Stengel | 455/38.3 |
| 5,117,449 | 5/1992 | Metroka et al. | 379/58 |
| 5,144,296 | 9/1992 | DeLuca et al. | 340/825.44 |
| 5,150,361 | 9/1992 | Wieczorek et al. | 370/95.1 |
| 5,173,927 | 12/1992 | Stömmer et al. | 375/81 |
| 5,191,091 | 3/1993 | Crisler et al. | 370/95.1 |
| 5,203,020 | 4/1993 | Sato et al. | 455/68 |
| 5,224,152 | 6/1993 | Harte | 379/59 |
| 5,230,084 | 7/1993 | Nguyen | 455/38.3 |
| 5,237,603 | 8/1993 | Yamagata et al. | 379/61 |
| 5,241,568 | 8/1993 | Fernandez et al. | 375/116 |
| 5,241,690 | 8/1993 | Larsson et al. | 455/54.1 |
| 5,252,963 | 10/1993 | Snowden et al. | 340/825.44 |
| 5,265,270 | 11/1993 | Stengel et al. | 455/343 |
| 5,274,843 | 12/1993 | Murai et al. | 455/38.3 |
| 5,291,542 | 3/1994 | Kivari et al. | 379/58 |
| 5,301,225 | 4/1994 | Suzuki et al. | 379/59 |
| 5,307,400 | 4/1994 | Sawyer et al. | 379/59 |
| 5,309,153 | 5/1994 | Gaskill et al. | 340/825.44 |
| 5,355,518 | 10/1994 | Kindinger et al. | 455/38.3 |
| 5,418,835 | 5/1995 | Frohman | 379/59 |
| 5,590,396 | 12/1996 | Henry | 455/22 |

FOREIGN PATENT DOCUMENTS

| | | |
|---|---|---|
| 0 319 219 A2 | 11/1988 | European Pat. Off. . |
| 0 375 067 A1 | 12/1989 | European Pat. Off. . |
| 2 115 195 | 1/1983 | United Kingdom . |
| 2244409 | 11/1991 | United Kingdom . |
| 92/10042 | 11/1991 | WIPO . |
| WO 93/22883 | 4/1993 | WIPO . |
| WO 9529568 | 11/1995 | WIPO . |

OTHER PUBLICATIONS

Commonly assigned, copending U.S. Application for Patent Serial No. 08/231,000 filed Apr. 20, 1994 and entitled "Method of and Apparatus for a Deep-Sleep Mode in a Digital Cellular Communication System".

*Primary Examiner*—Reinhard J. Eisenzopf
*Assistant Examiner*—Darnell R. Armstrong
*Attorney, Agent, or Firm*—Jenkens & Gilchrist

[57] ABSTRACT

A cellular communications system including a mobile station that shifts periodically between a stand-by operating mode where communications are possible and a deep sleep operating mode wherein communications are impossible and battery power is conserved. Thus, while the mobile station is in deep sleep mode, message transmissions to the mobile station are impossible. The messages are, however, stored for later delivery, and a record of the stored, undelivered messages is maintained for future access. When the mobile station emerges from deep sleep, the maintained message record is checked, and the stored messages for the awakened mobile station are retrieved and delivered.

19 Claims, 7 Drawing Sheets

METHOD AND APPARATUS FOR SUPPORTING THE DELIVERY OF SHORT MESSAGE SERVICE MESSAGES TO SLEEPING MOBILE STATIONS IN A CELLULAR COMMUNICATIONS SYSTEM

This application is a division of application Ser. No. 08/447,401, filed on May 23, 1995, now abandoned.

BACKGROUND OF THE INVENTION

1. Technical Field of the Invention

The present invention relates to mobile cellular telephone communications systems and, in particular, to the delivery of short message service (SMS) messages to sleeping mobile stations.

2. Description of Related Art

It is well known that mobile stations (telephones) in cellular telephone systems consume large amounts of power while operating in a talk mode. Consumption of power at a significant, albeit reduced, rate continues when the mobile station operates in a stand-by (i.e., idle) mode awaiting receipt or origination of a telephone call. For currently available portable, battery powered mobile stations, the on-board battery typically has a working lifetime of approximately eight hours in the stand-by mode and two hours in the talk mode. After such time expires, the battery must be recharged or replaced in order for the mobile station to continue to provide cellular telephone service.

Many methods and apparatus have been proposed to reduce power consumption in mobile stations and thus extend battery life between charges or replacement. One proposed apparatus for use in a mobile station detects when a call message (page) broadcast within the cell is intended for another mobile station. In response to such a detection, drain on the battery is reduced by denying or reducing the supply of power to certain electronic components of the mobile station such as the receiver, display or processor. A clock is monitored to maintain power denial or reduction for a time period lasting until the expected time of receipt of a subsequent message at which time power is restored, and the monitoring of the page continues.

Another proposed solution to the power drain concern divides processing responsibilities up within the mobile station. Complicated but infrequently used functions are performed only when needed by a relatively high power drain processor. Conversely, less complex but more frequently used functions are performed constantly by a second reduced power drain processor that further functions to reduce drain on the battery by placing the first processor in a low power consumption holding state when not needed.

A further proposed solution deactivates the mobile is station transmitter to conserve power, and determines from an earlier portion of a received signal the likelihood that the mobile station will have to use the transmitter at the end of the received signal to return an acknowledgment. If the likelihood is low, deactivation of the transmitter continues. If the likelihood is high, however, power is returned to the transmitter and a later portion of the received signal is monitored to determine if an acknowledgment is necessary.

The foregoing solutions, while certainly effective in reducing power drain, are not favored due to their complexity of implementation and added cost. Often ignored is perhaps the most effective means for conserving mobile station power—that is, to turn the mobile station off. This method is not desired for a number of reasons known to both the using public and those skilled in the art including the fact that when the mobile station is turned off, the user cannot make use of the mobile station to receive or originate telephone calls. A further drawback of turning the mobile station off is that short message service (SMS) messages and any other cellular communications systems messages cannot be received by the mobile station. Failure to receive these messages could adversely affect the usability and operability of the mobile station in ways known to those skilled in the art.

In spite of the use of the foregoing solutions and other available solutions providing varying degrees of success in reducing power drain in mobile stations, there continues to exist a need for a method and apparatus that will facilitate the effective conservation of power by mobile stations approaching that provided by turning the mobile station off. Such a solution should preferably further provide the cellular communications system access to the mobile station for a number of functional reasons, including the delivery of short message service messages and other cellular communications system messages.

SUMMARY OF THE INVENTION

A mobile telephone is provided that includes a timer and circuitry responsive to the timer for periodically placing the mobile station in a "deep sleep" mode of operation wherein the mobile station is essentially turned off by denying or reducing power supplied to certain components. While in deep sleep mode, efficient and effective conservation of battery power is achieved. The mobile station automatically awakens from deep sleep mode after the expiration of a predetermined time period, as measured by the timer, to allow contact by the cellular communications system and receive telephone communications and stored messages.

While the mobile station is in deep sleep mode, no calls, messages, and in particular no short message service (SMS) messages, are capable of being received. The cellular communications system supports power conservation by, along with the future delivery of these important messages to, the mobile stations by storing the received but currently undeliverable message. Thus, these messages are not lost due to mobile station deep sleep mode. A message waiting indicator flag is also set in the mobile switching center, and/or visitor location register and/or home location register for each mobile station having a stored message. When the timer expires and the mobile station emerges from deep sleep mode, notification is provided that the mobile station is now awake and operating. Responsive to this notification, and further in response to the set message waiting indicator flag for the awakened mobile station, the cellular communications system clears the set flag, inhibits mobile station re-entry into deep sleep, retrieves the message from storage, and delivers the message to the mobile station. Thus, with the method and apparatus of the present invention, delivery of important messages as well as conservation of battery power is effectuated.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF EMBODIMENTS

Figure 1:
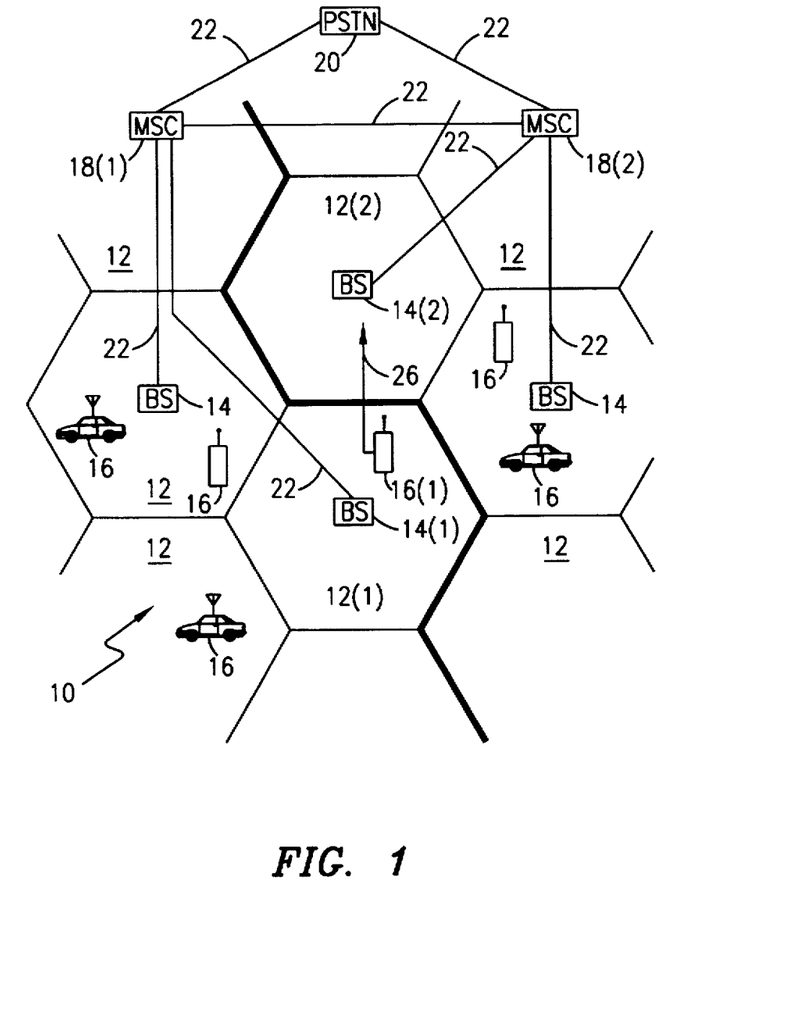
FIG. 1 is a simplified block diagram of a mobile station for use in a cellular communications network in accordance with the present invention.

Reference is now made to FIG. 1 wherein there is shown a simplified block diagram of a mobile station 10 for use in a cellular communications network (see, FIG. 2) in accordance with the present invention. The mobile station 10 includes a processor 12 connected to a transceiver 14. An antenna 16 is connected to the transceiver 14 for transmitting and receiving communications (both voice and data) over a cellular telephone network. Power for the mobile station 10 is supplied by a renewable or replaceable power source 18 typically comprising a battery. There are other components included in the mobile station 10 (like a handset, keypad, etc.) and not shown in FIG. 1 whose nature, operation and interconnection with the illustrated components are known to those skilled in the art.

The mobile station 10 functions in accordance with three primary modes of operation. The first mode comprises a "talk" mode wherein a subscriber uses the mobile station 10 to communicate telephonically via the cellular telephone network. As is well known to those skilled in the art, because nearly all of the components of the mobile station 10 are operating during the talk mode, this mode of operation consumes an enormous amount of power output from the power source 18. Such power consumption will quickly drain the power source 18.

The second mode comprises a "stand-by" mode wherein the mobile station 10 awaits use by the subscriber in originating or receiving a telephone call or messages. While in the stand-by mode, some of the components of the mobile station 10 continue to operate and thus continue to require and consume power supplied by the power source 18. Other components, though, are unused and not operating and thus do not consume power. Accordingly, overall power consumption occurs at a reduced rate in comparison to that experienced with the talk mode.

The third mode of operation comprises an "off" mode where the subscriber simply turns off the mobile station 10. In fact, placement of the mobile station 10 in the off-mode often involves using a switch to disconnect the power source 18 from many of the mobile station components. Accordingly, in the off mode little to no power is drained from the power source 18 by the mobile station 10 because few, if any, of the components of the mobile station continue to operate. Placement of the mobile station in the off mode provides the most effective means for conserving power supplied by the power source 18.

The mobile station 10 of the present invention includes an additional fourth mode of operation comprising a "deep sleep" mode that may be described as being relatively positioned, as far as operation is concerned, somewhere between the previously described stand-by and off modes of operation. In the deep sleep mode of operation, certain ones of, but not necessarily all of, the components of the mobile station 10 are temporarily shut off (denied power) in order to conserve the drain of power from the power source 18. By denying power to such components, overall power consumption by the mobile station 10 occurs at a reduced rate in comparison to that experienced with the stand-by mode.

To facilitate this fourth mode of operation, the mobile station 10 further includes an internal timer 20 for counting predetermined time periods and having an output connected to power control circuitry 22. When the timer 20 is counting in a first time period, power control circuitry 22 supplies power to the mobile station 10 components and the mobile station operates in the stand-by mode ready to participate in mobile station activities like engage in the talk mode and/or receive messages as described above. When the first time period expires, the power control circuitry 22 denies power to certain components of the mobile station 10 (e.g., the transceiver 14), temporarily placing the mobile station into the deep sleep mode that conserves power drain beyond that provided by the stand-by mode. The timer 20 then counts a second time period, after the expiration of which circuitry 22 restores power to the previously affected components of the mobile station 10. The mobile station 10 then awakens back into the stand-by mode ready to receive and transmit telephone calls (by further entering into the talk mode), as well as to receive messages. Operation of the mobile station 10 in the stand-by mode will continue until the expiration of the first time period is again measured by the timer 20 (or alternatively for as long as the network instructs), at which time the deep sleep mode will again be temporarily entered. The cycling between the stand-by and deep sleep operating modes in accordance with the measuring of the predetermined first and second time periods by the timer 20 continues unless interrupted by the instigation of a talk mode, by direction of the subscriber, or by direction (i.e., instruction) of the cellular communications network.

It will, of course, be understood that the power control circuitry 22 need not be separate and apart from the processor 12 as shown in FIG. 1. The processor 12 may include means (operating like circuitry 22) responsive to the output of the timer 20 for selectively disconnecting power from or shutting off certain components of the mobile station such as the transceiver 14. The processor 12 is therefore capable of being programmed in any manner desired to act in response to the timer 20 output. Preferably, however, the control circuitry 22 will be separate because the processor 12 itself comprises one of the more power hungry components of the mobile station 10, and one choice for providing effective and efficient reduction of power consumption in the mobile station may comprise shutting off the processor as well as the other components having significant power consumption requirements like the transceiver 14.

While in the deep sleep mode of operation, preferably at least the communications related components of the mobile station 10 will be shut off to conserve power, and the mobile station thus will not be able to communicate over the cellular communications network. Thus, while in the deep sleep mode of operation, no telephone calls or messages (such as short message service (SMS) messages) will be received or transmitted. Not only will incoming calls to the subscriber be impossible, but the cellular communications network will be unable to effectuate delivery of messages to the mobile station. It is vitally important, however, that delivery of certain messages from the network to the mobile station 10 be accomplished even if such delivery cannot be accomplished immediately due to the deep sleep mode of operation. Accordingly, some apparatus and method must be utilized to provide for subsequent delivery of these important messages to the mobile station 10.

Figure 2A:
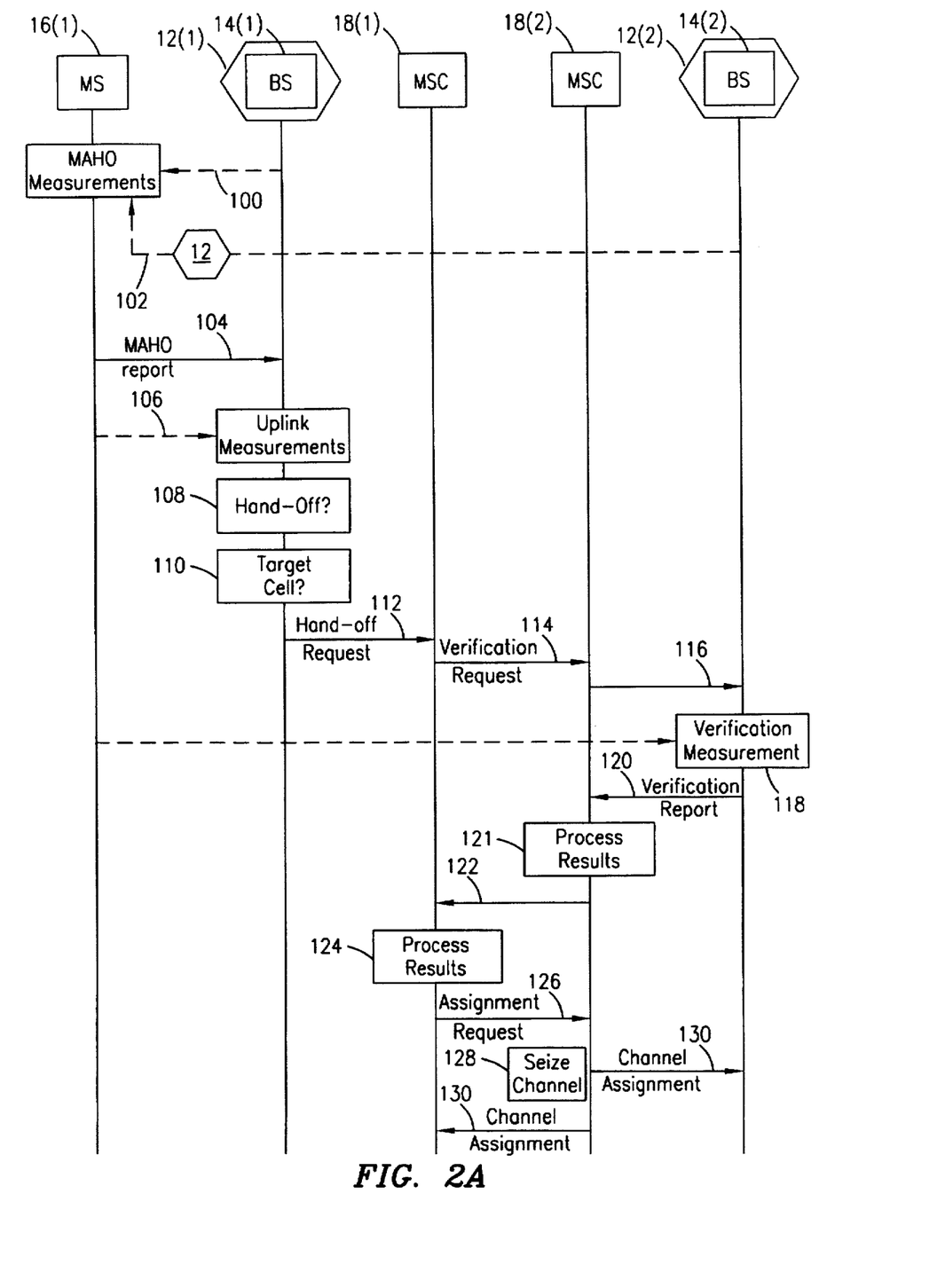
FIG. 2 is a schematic diagram of a cellular communications network within which the mobile station of FIG. 1 operates.
Figure 2B:
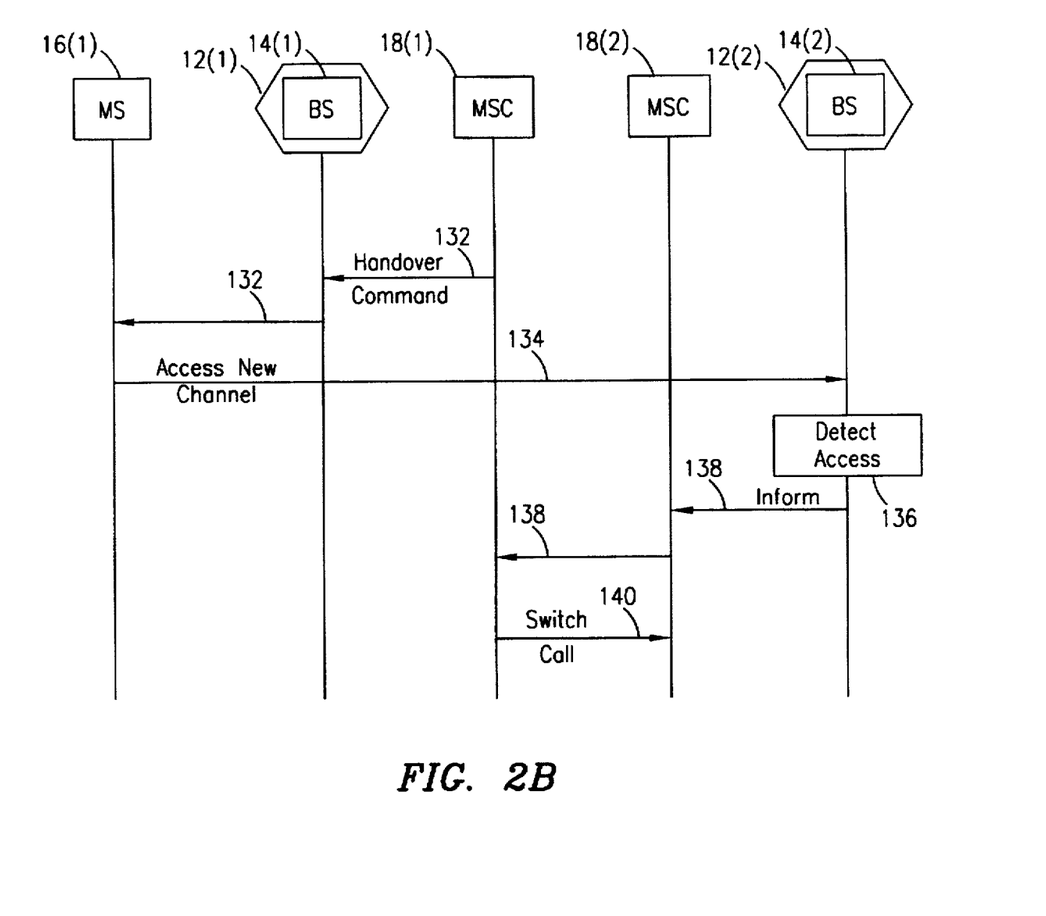

Reference is now made to FIG. 2 wherein there is shown a schematic diagram of a cellular communications network 50 within which the mobile station 10 of FIG. 1 operates. It will, of course, be understood that the network 50 services a substantial number of mobile stations 10 (schematically represented by circles), only a few of which are shown in the figure for sake of clarity.

The network 50 provides cellular communications services to a plurality of service areas 52 (four of which are shown outlined in bold). It will be understood that in many instances more than four services areas 52 will be needed to cover a certain geographic area. Each service area 52 is comprised of a plurality of cells 54 (seven are shown in each service area), wherein each cell includes a base station 56 (schematically represented by a rectangle) for effectuating radio frequency communications with proximately located mobile stations. It will, of course, be understood that different service areas 52 may include different numbers of cells 54, and that more cells than that shown may be needed in certain service areas (for example, in a high population density or cellular use area), and less in other areas (for example, a rural area). The inclusion of seven cells 54 per service area 52 is therefore by way of illustration only.

The plurality of base stations 56 within each service area 52 are connected to a mobile switching center 58 (schematically represented by a star) for that service area. Such a connection may be by way of wireline or radio frequency communications links. The plurality of included mobile switching centers 58 are further connected to the public switched telephone network and/or to an integrated services digital network (neither shown). Although not shown, it will, of course, be understood that more than one mobile switching center 58 may be included in each service area 52 if needed.

Figure 3:
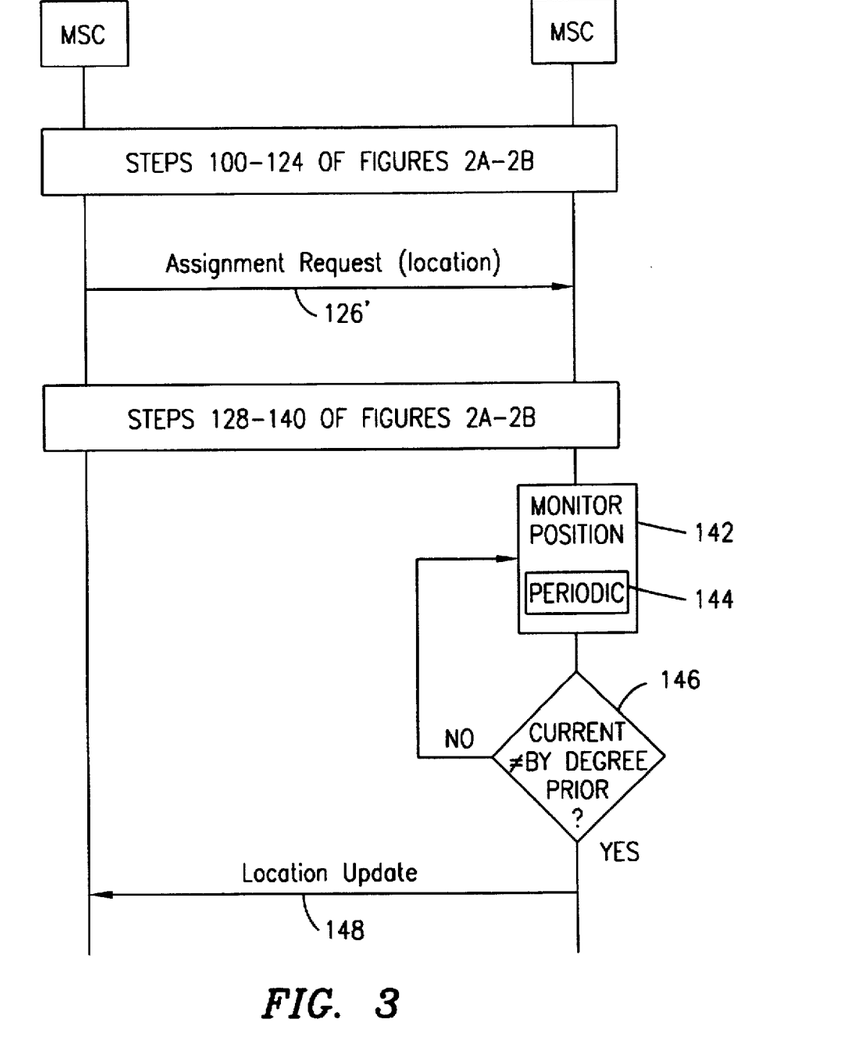
FIG. 3 illustrates in simplified block diagram format the components of the mobile switching centers used in the cellular communications network of the present invention shown in FIG. 2.

Referring now to FIG. 3, each mobile switching center 58 for a service area 52 includes a message center 60, a home location register 62 and a visitor location register 64. It will, of course, be understood that the message center, home location register and visitor location register functionality may be alternatively implemented in stand-alone fashion. The message center 60 maintains some subscriber profiles, and further receives, stores and forwards short message service (SMS) messages, and perhaps other message types, addressed for delivery to the subscriber mobile stations 10. The home location register 62 stores permanent data for each subscriber that is independent of the current location of the subscriber. The home location register 62 may further store temporary data concerning the address in the message center 60 of any stored short message service messages, and an indication of a message waiting to be delivered to the mobile station. The visitor location register 64 stores current data for each subscriber including the current or most recently known location of the mobile station 10 for the subscriber, the on/off status of the mobile station, security parameters, and an indication of a message waiting to be delivered to the mobile station.

Figure 4:
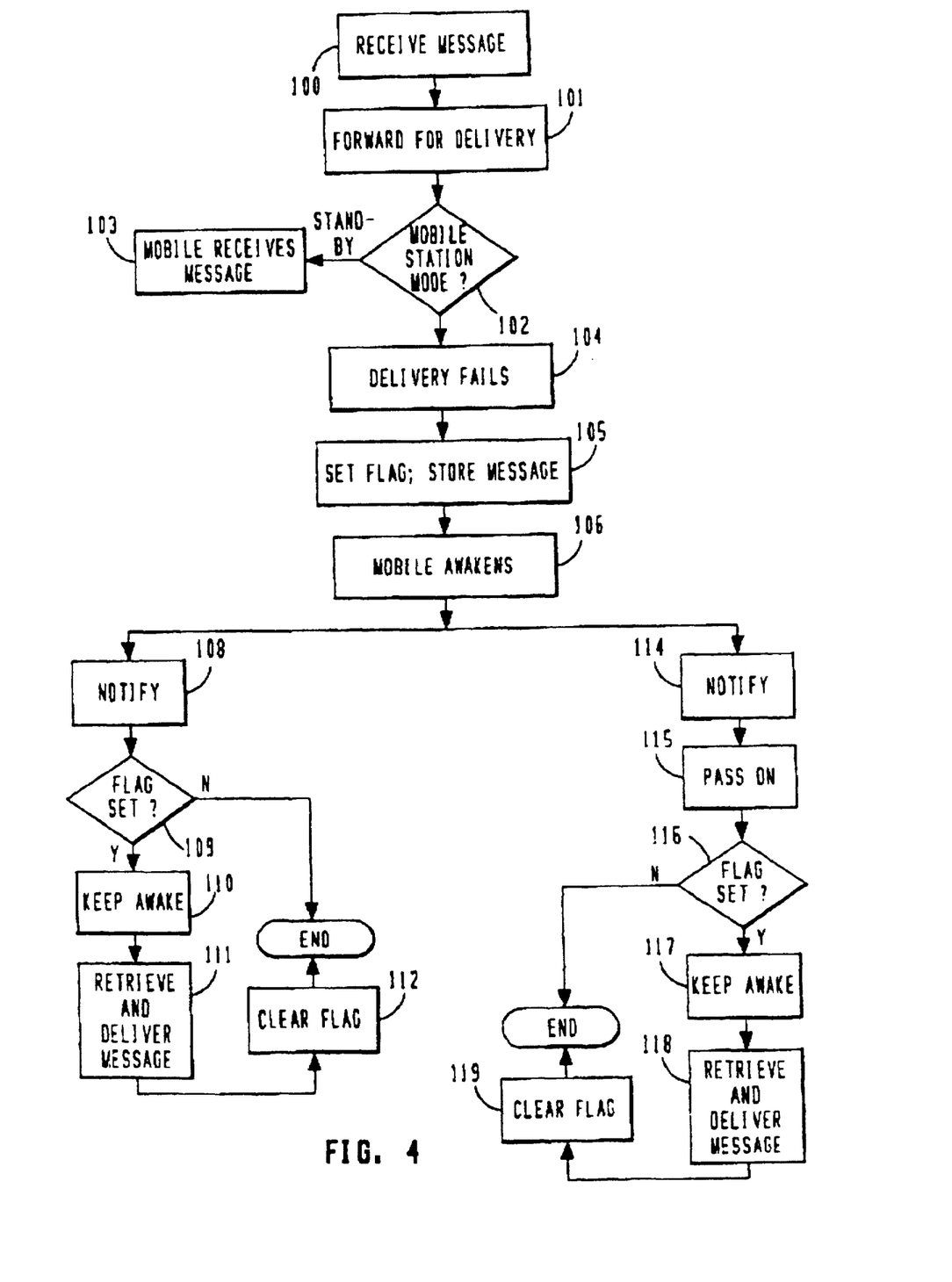
FIG. 4 is a flow diagram generally illustrating the operation of the cellular communications network to deliver messages to the mobile station of the present invention.

Now, with additional reference to FIG. 4, wherein there is shown a flow diagram illustrating operation of the present invention, a description will be provided concerning the general operation of the cellular communications network to deliver messages to mobile stations 10 having deep sleep mode capabilities. When a short message service (SMS) message is received by the message center 60 in the mobile switching center 58 (step 100), the message is forwarded through the network for delivery to the proper mobile station 10 (step 101). If the intended recipient mobile station 10 is currently operating in stand-by mode (decision step 102), the message will be received by the mobile station (step 103). If, on the other hand, the intended recipient mobile station 10 is shut off in the power saving deep sleep mode (decision step 102), the message delivery fails (step 104). Following failure, a message waiting indicator flag is set for the intended recipient mobile station in the mobile switching center 58, visitor location register 64 and/or home location register 62, and the message is stored (step 105).

When the predetermined power saving time period expires as measured by the timer 20 in the mobile station 10, power will be restored to the mobile station and the mobile station will awaken back into the stand-by mode ready to receive messages (step 106). When the mobile station awakens, it will either be located in the service area for the mobile switching center 58 in which it went to sleep, or it will be located in a new service area with another mobile switching center. If the mobile station 10 awakens in the same service area (path 107), it will first provide notification to the serving mobile switching center 58 that it is again operational and ready to receive messages (step 108). The mobile station 10 then checks in decision step 109 whether its message waiting indicator flag is set. If the flag is not set, the mobile station returns to the deep sleep mode in order to conserve power. If the flag is set, the mobile station is kept awake in step 110 and short message service messages for the mobile station are then retrieved from storage and delivered to the mobile station (step 111). After delivery of all messages is complete, the message waiting indicator flags for the mobile station 10 are cleared (step 112), and the mobile station returns to the deep sleep mode in order to conserve power.

If the mobile station 10 awakens in a different service area (path 113), it will first provide notification to the currently serving mobile switching center 58 that it is again operational and ready to receive messages (step 114). This message is passed on in step 115 to the previously serving mobile switching center where the messages for the mobile station are stored. The mobile station 10 then checks in decision step 116 whether its message waiting indicator flag is set. If the flag is not set, the mobile station returns to the deep sleep mode in order to conserve power. If the flag is set, the mobile station is kept awake in step 117 and short message service messages for the mobile station are then retrieved from storage and delivered to the mobile station (step 118). After delivery of all messages is complete, the message waiting indicator flags for the mobile station 10 are cleared (step 119), and the mobile station returns to the deep sleep mode in order to conserve power.

Referring again now to both FIGS. 2 and 3, it is known to those skilled in the art that one service area 52 will be designated the "home" service area for each mobile station 10. The home service area typically comprises the service area 52 within which the mobile station 10 is most often located or within which the subscriber lives. The home location register 62 in the mobile switching center 58 for the "home" service area 52 will store the permanent data associated with each subscriber mobile station 10 that is home within that service area. Similarly, the message center 60 in the mobile switching center 58 for the "home" service area 52 will store any received messages for subscriber mobile stations 10 that are home within that service area.

A code is also stored in the home location register 62 identifying the visitor location register 64 storing the current or most recently known location of the mobile station for the subscriber. This may comprise the visitor location register 64 in the mobile switching center 58 for the "home" service area for the subscriber if the mobile station is located therein, or the visitor location register in a mobile switching center for another, different service area that the subscriber is currently visiting. Data for the subscriber relating to the current or most recently known location of the mobile station 10, the on/off status of the mobile station, security parameters, and an indication that a message is waiting to be delivered, are stored in the mobile switching center 58 for the current service area 52. All communications, including message transmissions, with the mobile station 10 carried by the subscriber will be switched by and routed through the mobile switching center 58 for the current service area 52.

Figure 5:
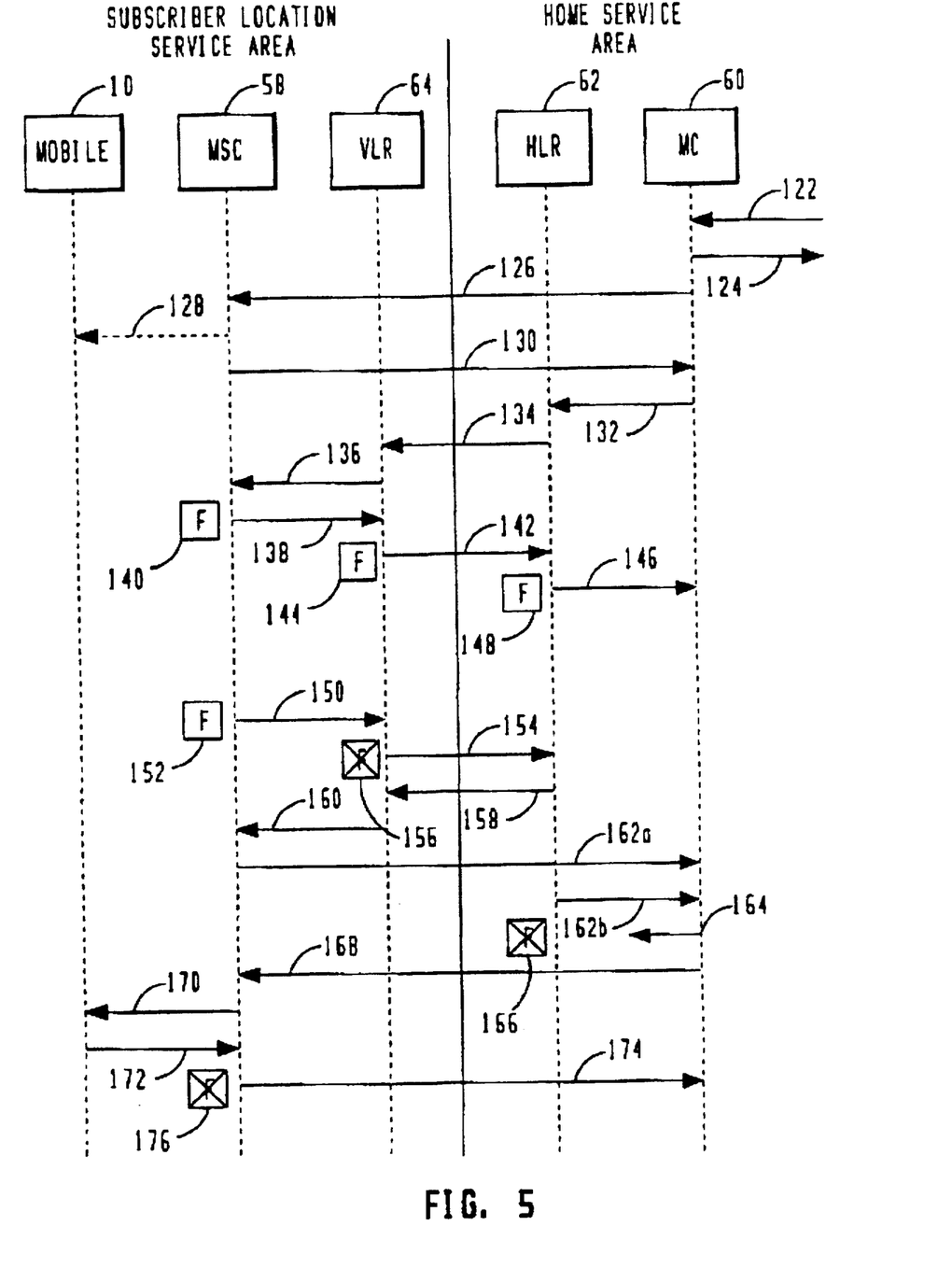
FIG. 5 is a communications transmittal flow diagram illustrating, in more detail than provided in FIG. 4, a first scenario of operation of the present invention.

Reference is now made to FIG. 5 wherein there is shown a communications transmittal flow diagram illustrating a first scenario of operation of the present invention. For this scenario, the mobile station 10 is assumed to be located in a service area 52 that may either be the same or different from the home service area 52 for the subscriber. FIG. 5 discloses more detail concerning the operation of the present invention than previously provided with respect to the general description illustrated in FIG. 4.

As shown by communications flow 122, the message center 60 for the home service area 52 of a subscriber receives and accepts a short message service (SMS) message intended for delivery to the mobile station 10 for the subscriber. This delivery may be made using a SMS point-to-point (SMS_PP) invoke transmission. In response to the receipt and acceptance of the message, the message center 60 transmits an acknowledgement (flow 124) to the sender.

If the message center 60 knows (or believes it knows) the current location of the subscriber, the received message is transmitted to the mobile switching center 58 for the service area 52 where the subscriber is currently located (flow 126). It will, of course, be understood that this service area may be either the home service area 52 for the subscriber or some other service area 52 where the subscriber is currently located. This delivery is made using a SMS point-to-point (SMS_PP) invoke transmission that includes the content of the message and/or the count of the number of messages stored in the message center 60 and waiting to be delivered to the subscriber mobile station 10. In response, the mobile switching center 58 will attempt to deliver the message to the mobile station 10 (broken line flow 128).

It is possible that when the delivery from the mobile switching center 58 is attempted, the mobile station 10 will be in the deep sleep operating mode and thus will not be capable of receiving the message. It is also possible that the mobile station 10 will not respond because it is not located in the service area 52 served by the mobile switching center 58 routing the message for delivery. The mobile switching center 58 will then respond for either of the foregoing cases to the message center 60 indicating the failure of the message delivery (flow 130).

The message center 60 may then choose to retry delivery in accordance with flows 126 and 128, or instead query the home location register 62 (flow 132) of the subscriber 66 in order to obtain the current status and location of the mobile station 10. This request is important in order to ascertain the location of the mobile station, and is made using a data service request (DSREQ) invoke transmission. This transmission identifies the intended recipient mobile station 10 and includes an identification of which network component is, or components are, designated to maintain the message waiting indicator flag for the mobile station. The message waiting indicator flag in each location designated by the transmission will be set as described herein. This request may further include information concerning the count of the number of messages stored in the message center and waiting to be delivered to the subscriber mobile station, or alternatively include the message itself if desired. The transmission to the home location register 62 may further be extended to visitor location registers 64 (flow 134) and mobile switching centers 58 (flow 136) in other service areas 52 in an attempt to locate the mobile station 10 that is the intended recipient of the message.

For a mobile station 10 located by the mobile switching center 58 and found to be in deep sleep mode, the mobile switching center responds to the requesting visitor location register 64 providing a sleep indication (flow 138). The response may further include information concerning the deep sleep mode characteristics of the mobile station 10 (e.g., length of the time period for sleeping) and/or address information. At this time, if the mobile switching center 58 is designated to maintain the message waiting indicator flag for the mobile station 10 (see, DSREQ flow 132), the flag F is set (at 140) indicating to the mobile station that a message has been stored and is waiting to be retrieved.

If the mobile station 10 is located by the visitor location register 64 (either by its own means or through receipt of a response from the mobile switching center 58 in flow 138) and found to be in deep sleep mode, the visitor location register responds to the requesting home location register 62 with the sleep indication (flow 142). The response may further include information concerning the deep sleep characteristics of the mobile station 10 (e.g., length of the time period for sleeping) and/or address information. Again, at this time, if the visitor location register 64 is designated to maintain the message waiting indicator flag for the mobile station 10 (see, DSREQ flow 132), the flag F is set (at 144).

When the mobile station 10 is located by the home location register 62 (either by its own means or through receipt of a response from the visitor location register 64 in flow 142) and found to be in deep sleep mode, the home location register responds to the requesting message center 58 with a sleep indication (flow 146). The response may further include information concerning the deep sleep characteristics of the mobile station 10 (e.g., length of the time period for sleeping) and/or address information. If the home location register 62 is designated to maintain the message waiting indicator flag for the mobile station 10 (see, DSREQ flow 132), the flag F is set (at 148).

The mobile station 10 will eventually awaken from deep sleep mode, notify the mobile switching center 58 serving the awakened mobile station. The mobile switching center may at any time thereafter instruct the mobile station to remain awakened. A test is then made to determine if the message waiting indicator flag for the mobile station is set. If no, the mobile station may return to deep sleep. If yes, the mobile switching center notifies the visitor location register 64 (flow 150) that the mobile station has awakened. This notification may be made using a registration notification (REGNOT) invoke transmission. If the mobile switching center 58 is designated to maintain the message waiting indicator flag for the mobile station 10 (see, DSREQ flow 132), and if the indicator flag had not been previously set, the flag F is set (at 152). Information concerning the deep sleep characteristics of the mobile station 10 (e.g., length of the time period for sleeping) and/or address information may also be sent by the mobile switching center 58.

In response to the notification from the mobile switching center 58, the visitor location register 64 notifies the home location register 62 (flow 154). This notification may also be made using a registration notification (REGNOT) invoke transmission. If the visitor location register 64 is designated to maintain the message waiting indicator flag for the mobile station 10, the flag is reset (at 156). Information concerning the deep sleep characteristics of the mobile station 10 (e.g., length of the time period for sleeping) and/or address information may also be sent by the visitor location register 64. Acknowledgement of the notification is sent from the home location register 62 to the visitor location register 64 (flow 158), and further sent to the mobile switching center 58 (flow 160).

In the meantime, either the mobile switching center 58 or the home location register 62 notifies the message center 60 to deliver the stored message (flows 162a and 162b). This notification is made using a short message service notification (SMSNOT) invoke transmission. Information concerning the location of the mobile station 10, and in particular the address of the mobile switching center 58 serving the mobile station 10, is also sent to the message center 60. The message center 60 acknowledges the notification received from either the mobile switching center 58 or the home location register 62 (flow 164). If the home location register 62 is designated to maintain the message waiting indicator flag for the mobile station 10, the flag is reset (at 166).

The message center 60 then initiates delivery of any stored messages for the mobile station 10 by using a SMS point-to-point (SMS_PP) invoke transmission to the serving mobile switching center 58 (flow 168). The transmission includes either the content of the message(s) or the count of the number of messages stored in the message center and waiting to be delivered to the subscriber mobile station. The mobile switching center 58 then forwards the transmission to the mobile station (flow 170), and receives an acknowledgement of receipt (flow 172). Following confirmation of delivery of the transmission to the mobile station 10, the mobile switching center 58 sends an acknowledgement of delivery to the message center 60 (flow 174) and the message waiting indicator flag in the mobile switching center is reset (at 176).

Communications flows 168–174 will be repeated until all outstanding messages stored in the message center 60 are delivered to the mobile station 10. Continued delivery of messages and/or the transmission of an appropriate command to the mobile station 10 will keep the mobile station from re-entering the deep sleep mode until all messages are delivered. Upon successful delivery of all messages, and unless previously accomplished, the count of the number of messages stored in the message center and waiting to be delivered to the subscriber mobile station 10 is reset to zero, and all message waiting indicator flags are reset. If there is a delivery failure, the mobile switching center 58 serving the mobile station 10 will transmit a failure message to the message center 60, and attempted delivery of the message will resume in accordance with FIG. 5 at either flow 126 or flow 132.

Figure 6:
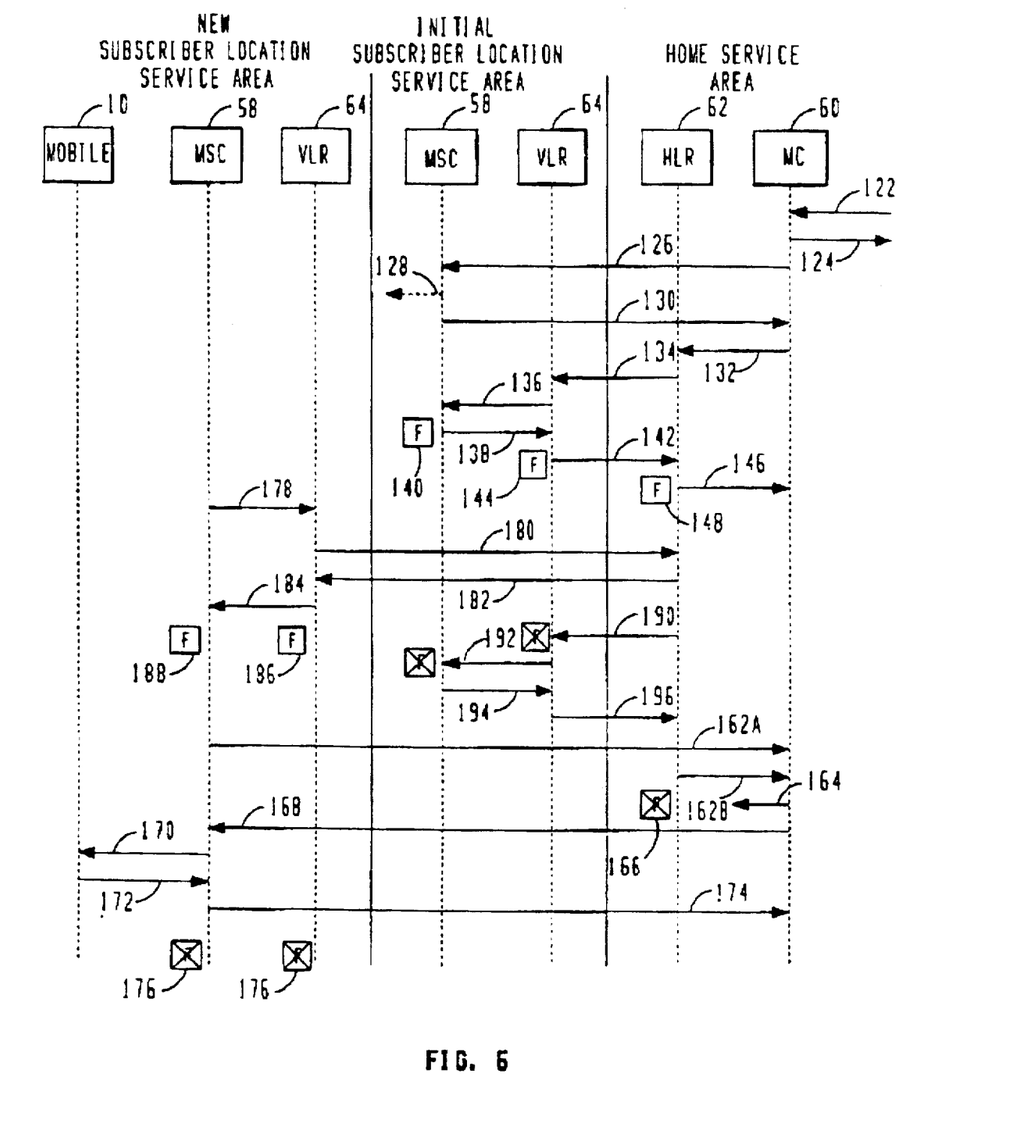
FIG. 6 is a communications transmittal flow diagram illustrating, in more detail than provided in FIG. 4, a second scenario of operation of the present invention.

Reference is now made to FIG. 6 wherein there is shown a communications transmittal flow diagram illustrating a second scenario of operation of the present invention. For this scenario, the mobile station 10 is initially located in a service area 52 that may either be the same or different from the home service area 52 for the subscriber 66. After the mobile station 10 enters the deep sleep mode, however, the mobile moves to a new service area 52 and awakens in that new service area. Again, FIG. 6 discloses more detail concerning the operation of the present invention than previously provided with respect to FIG. 4.

In the second scenario illustrated in FIG. 6, communications flows 122–148 are same as those executed with respect to the first scenario of FIG. 5. Accordingly, the disclosure of flows 122–148 from FIG. 5 is incorporated herein by reference.

The mobile station 10 will eventually awaken from deep sleep mode. However, in this scenario illustrated by FIG. 6, in the period of time since entering deep sleep mode, the mobile station 10 has moved and awakens in a different service area 52. In response to the awakening, the new mobile switching center 58 in the service area currently serving the awakened mobile station is notified and will further notify the visitor location register 64 (flow 178) for the currently serving service area 52. This notification is made using a registration notification (REGNOT) invoke transmission. Information concerning the deep sleep characteristics of the mobile station 10 (e.g., length of the time period for sleeping) and/or address information may also be sent by the mobile switching center 58.

In response to the notification from the mobile switching center 58, the visitor location register 64 in the currently serving service area 52 notifies the home location register 62 (flow 180) in the home service area 52. This notification is also made using a registration notification (REGNOT) invoke transmission. Information concerning the deep sleep characteristics of the mobile station 10 (e.g., length of the time period for sleeping) and/or address information may also be sent by the visitor location register 64. Acknowledgment of the notification is sent from the home location register 62 to the visitor location register 64 (flow 182) in the currently serving service area 52, and further sent to the mobile switching center 58 (flow 184) in the currently serving service area 52. With this acknowledgment, and if the message waiting indicator flags in the initial service area had been set, the message waiting indicator flags in both the visitor location register 64 and the mobile switching center 58 located in the current service area will be set (at 186 and 188, respectively).

The home location register 62 may further cancel registration of the mobile station 10 with, and clear message waiting indicators maintained by, the mobile switching center 58 and visitor location register 64 in service area 52 where the mobile station was previously located. This notification is made using a registration cancellation (REGCANC) invoke transmission to the visitor location register 64 (flow 190) that is further forwarded to the mobile switching center 58 (flow 192). Acknowledgment of the notification is sent from the mobile switching center 58 to the visitor location register 64 (flow 194) in the previously serving service area 52, and further sent to the home location register 62 (flow 196) in the home service area 52.

A test is then made to determine if the message waiting indicator flag for the mobile station is set. If no, the mobile station may return to deep sleep. If yes, the remaining communications flows of the second scenario illustrated in FIG. 6 are same as flows 162–176 executed with respect to the first scenario of FIG. 5. Accordingly, the disclosure of flows 162–176 from FIG. 5 is incorporated herein by reference. It will, of course, be understood that the mobile switching center 58 referred to in flows 162–176 with respect to FIG. 6 is, however, the mobile switching center in the service area where the mobile station is currently located, not the mobile switching center serving the previous location of the mobile station. As described earlier, flows 168–176 will be repeated until all outstanding messages stored in the message center 60 are delivered to the mobile station 10 in the service area 52. Following successful delivery of all messages, all message waiting indicator flags for the mobile station 10 are reset (see, at 176), if not previously reset.

With only minor protocol modifications, the method and apparatus of the present invention may be implemented into the existing IS-41 communications standard signaling protocol. The DSREQ, SMS_PP and SMSNOT messages utilized by the present invention are not included in the IS-41B protocol. However, these messages are relatively easily added to the protocol. Furthermore, new parameters relating to the SMS message, the SMS message count, the message waiting indicator, delivery failure due to deep sleep mode, mobile station sleep characteristics, and flag setting must be added to the IS-41 protocol. It will further be understood that the method and apparatus of the present invention is available for use in connection with other industry standard and proprietary protocols with relatively minor modifications.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A radio communications system, comprising:
    a plurality of mobile stations, each mobile station including means for temporarily placing the mobile station in a power conservation mode of operation wherein receipt of communications messages is not possible, and for generating a notification informing the system that the mobile station has terminated its power conservation mode of operation;
    a communications network for delivering received communications messages to the plurality of mobile stations, said network including:
        a message center node for storing received communications messages intended for delivery to the mobile stations;
        another network node connected to the message center node for setting a message flag indicating the storage of a received communications message for a designated one of the mobile stations when delivery of the communications message to the designated mobile station by the communications network fails; and
        means responsive to both the mobile station notification of the termination of the power conservation mode of operation in the designated mobile station and the setting of the message flag for retrieving and forwarding the stored communications message for delivery to the designated mobile station.

2. The system as in claim 1 wherein the means for temporarily placing the mobile station in the power conservation mode of operation comprises:
    a timer for alternatively counting a first time period and a second time period; and
    circuit means responsive to the counting of the second time period by the timer for controlling the consumption of power by the mobile station.

3. The system as in claim 2 wherein the circuit means comprises means for denying power to certain power consuming components of the mobile station.

4. The system as in claim 3 wherein the mobile station further includes a transceiver circuit and the means for denying restricts the supply of power to the transceiver circuit.

5. The system as in claim 2 wherein the circuit means comprises means for reducing the consumption of power by certain power consuming components of the mobile station.

6. A communications message delivery method for use in a radio communications system including a plurality of mobile stations each functioning to temporarily enter into a power conservation mode of operation wherein receipt of communications messages is not possible and further functioning to generate a notification indicative of the termination of the power conservation mode of operation, the method comprising the steps of:
    receiving a communications message addressed to a designated mobile station;
    attempting delivery of the received communications message to the designated mobile station; and
    if the attempted delivery of the received communications message fails:
        storing the received communications message in a message center node for subsequent retrieval;
        setting a message waiting flag in a node of the system other than the message center node indicative of the storage of the received communications message for the designated mobile station; and
        responsive to the mobile station supplied notification of the termination of the power conservation mode of operation in the designated mobile station, and further in response to the setting of the message waiting flag for the designated mobile station, retrieving from storage and forwarding via the radio communications system the stored communications message for delivery to the designated mobile station.

7. The method as in claim 6 further including the step of repetitively placing the mobile station into and out of a mode of operation wherein power is conserved.

8. The method as in claim 7 wherein the step of repetitively placing includes the step of temporarily denying power supply to certain components of the mobile station.

9. The method as in claim 7 wherein the step of repetitively placing includes the step of temporarily reducing the amount of power supplied to certain components of the mobile station.

10. A cellular communications system providing communications with a plurality of mobile stations, comprising:
    a mobile switching center;
    a home location register for storing data concerning certain ones of the mobile stations home within an area serviced by the mobile switching center;
    a visitor location register for storing data concerning certain ones of the mobile stations believed to be currently located in the area serviced by the mobile switching center;
    a message center for storing messages intended for delivery to the certain ones of the mobile stations home within the area serviced by the mobile switching center; and
    means connected to the home location register, visitor location register and message center for routing a received message to an intended recipient mobile station, said means including:
        means in either the mobile switching center, home location resister or visitor location register for setting a flag in response to a failure to deliver the message to the intended recipient mobile station due to unavailability; and
        means responsive to a mobile station transmitted notification informing the system that the mobile station has terminated its power saving mode of operation along with the setting of the flag for retrieving the stored message from the message center, and for forwarding the retrieved message to the intended recipient mobile station.

11. The system as in claim 10 wherein the means for routing utilizes the data stored in the home and visitor location registers for identifying the location of the intended recipient mobile station.

12. The system as in claim 10 wherein the means for routing further included means for clearing set flags following the delivery of the retrieved message to the intended recipient mobile station.

13. The system as in claim 10 further including means for interacting with other mobile switching centers to route and deliver messages to intended recipient mobile stations.

14. A cellular communications system, comprising a plurality of service areas;

a plurality of mobile stations moving through the service areas, each mobile station including means for temporarily entering into a power conserving mode of operation wherein receipt of system communications messages is not possible, and for generating a notification informing the system that the mobile station has terminated its power conservation mode of operation;

a message center for storing received system communications messages for the mobile stations; and a mobile switching center serving each one of the plurality of service areas, each mobile switching center including:

means for transmitting received system communications messages to mobile stations located in its service area;

means responsive to a failure in the delivery of a system communications message to a designated one of the mobile stations due to the power conserving mode of operation of the designated mobile station for storing the system communications message in the message center and for setting a message waiting flag in the mobile switching center for the designated mobile station; and means responsive to the mobile station notification of the termination of the power conserving mode of operation in the designated mobile station, and the setting of the message flag of the designated mobile station for retrieving the system communications message from storage in the message center, and for forwarding the retrieved communications message to the designated mobile station using the means for transmitting.

15. The cellular communications system as in claim 14 wherein the mobile switching center further includes means for clearing the set message flag following delivery of the message to the designated mobile station.

16. The cellular communications system as in claim 14 further including means for notifying other mobile switching centers when the mobile station terminates power conservation mode in a service area different from the service area where it entered power conservation mode.

17. The system of claim 1 further including means for restricting mobile station re-entry into the power conserving mode of operation until completion of delivery of the stored communications messages.

18. The system of claim 10 wherein the set flag is maintained in the visitor location register and further including means for transferring the set flag from one visitor location register to another visitor location register with mobile station movement.

19. The system of claim 10 further including means for clearing the set flag upon message delivery to the intended recipient mobile station.

* * * * *